Jan. 15, 1935.    C. W. STEWARD    1,988,093
LANDING GEAR
Filed March 1, 1932
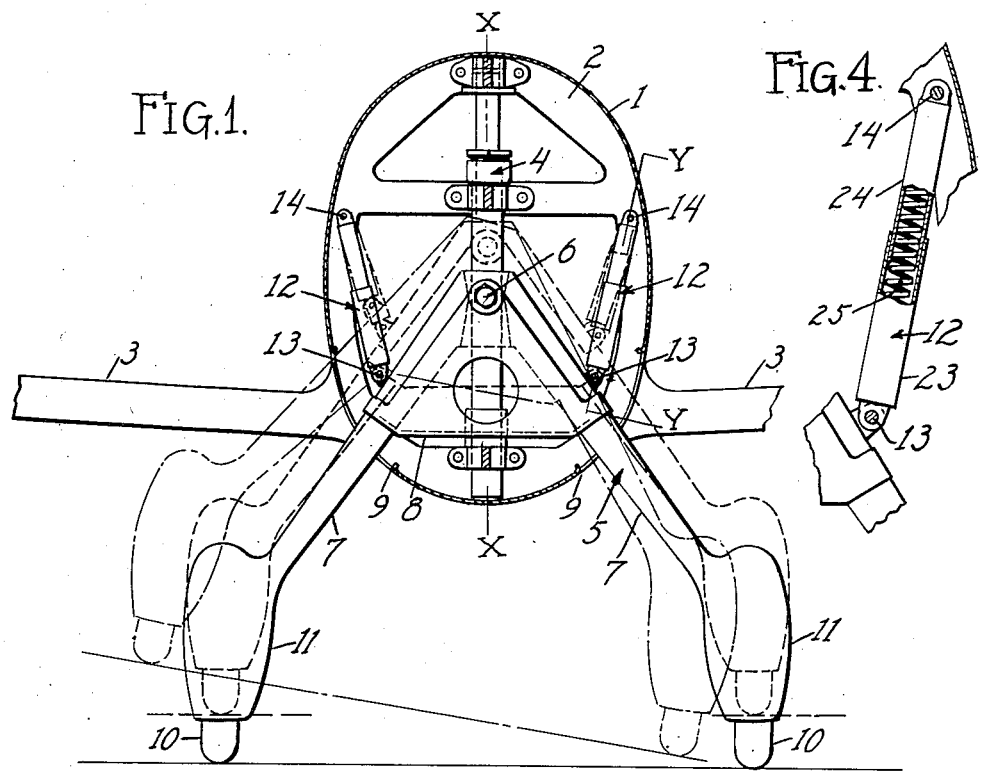
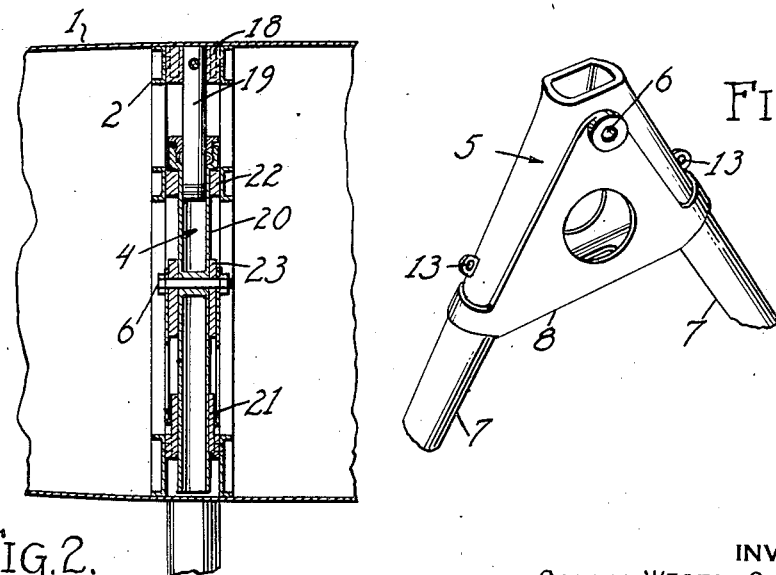
INVENTOR
COLBY WESTON STEWARD.
BY his ATTORNEY Patented Jan. 15, 1935

1,988,093

UNITED STATES PATENT OFFICE 1,988,093

LANDING GEAR

Colby W. Steward, Buffalo, N. Y., assignor to Curtiss Aeroplane & Motor Company, Inc., a corporation of New York Application March 1, 1932, Serial No. 595,975

3 Claims. (Cl. 244—2)

This invention relates to landing gears for aircraft.

One of the objects of my invention is to provide a simplified arrangement of landing gear parts such that head resistance and so-called parasite drag is reduced in the aircraft.

Another object of my invention is to combine the usual two shock absorber struts on the conventional landing gear, substituting only one such strut to apply to both wheels of the landing gear.

Another object of my invention is to eliminate the use of external braces, wires and structures, using in place thereof single strong struts emanating from the body of an airplane, such struts being shaped in a manner to reduce parasite drag.

Another object of my invention is to enclose all bracing and shock absorbing means within the body of an airplane, so that the body will by no additional increase in size or change in shape encompass such bracing and struts, tending for increased speed in the airplane by elimination of external members tending to increase the drag.

Another object of my invention is to provide a landing gear of such nature that the tread, or distance between the wheels, will not change between the attitude of the airplane in flight, when the landing gear hangs down, and the attitude of landing, when the landing gear is under maximum compression. This has advantages in minimizing tire wear, side thrust on wheels, and on axles.

Further objects will be apparent from a reading of the subjoined specification and claims, and from a consideration of the accompanying drawing.

In order to explain the invention more clearly, one embodiment thereof is shown in said drawing, in which:

Fig. 1 is a front cross section elevation of a body and landing gear arranged as an inverted V showing the groups of features comprising my invention;

Fig. 2 is a side elevation showing the application of a single shock absorber strut or oleo strut within the body of an airplane;

Fig. 3 is a view of the upper part of the landing gear shown in Fig. 1, arranged as an inverted V; and Fig. 4 is a partly sectional view of a taxiing and centering spring applied to the landing gear and body shown in Fig. 1.

Similar numbers in the drawing designate similar parts.

In Fig. 1, 1 is the body of an airplane, which may comprise any of the usual methods of construction, namely braced tubing structure covered with fabric, veneer, or metal, or monocoque incorporating strengthening bulkheads. 2 is a bulkhead or structure within body 1, adapted to support the landing gear and distribute landing gear stresses throughout the airplane. 3 denotes the wings of the airplane, the arrangement or nature of which have no relation to this invention. 4 is a central, vertical shock absorber strut attached firmly to the bulkhead 2, and serving as the main support for the landing gear. This invention is not concerned with the detail design of this strut, but further reference to Fig. 2 will show its operation. 5 is the landing gear arranged as an inverted V, and having mounted thereon suitable landing means such as wheels, also shown partially in Fig. 3. This landing gear 5 is pivoted to strut 4 at a pivot 6, allowing the landing gear to move laterally about pivot 6, but limiting its movement vertically to that of a movable portion of strut 4. The individual landing gear struts 7 extend outwardly and downwardly through suitable holes 9 in the body 1, these holes being of such size and shape that the landing gear 5 may move vertically parallel to the plane of bulkhead 2 and with relation to body 1, or may swing laterally over a limited angular range around pivot 6 parallel to the plane of bulkhead 2. Bracing means to strengthen the landing gear 5 are provided by a bracing 8 to prevent the struts 7 from splitting apart when loads are applied to their lower extremities. This brace, in the embodiment shown consists of gusset plates firmly attached to struts 7, but other forms of bracing would serve an equivalent purpose. Such bracing lies wholly within the body.

At the lower extremities of struts 7 are positioned wheels 10, mounted to struts 7 on suitable axles, not shown, and made part thereof, or wheels 10 may be enclosed within streamline covers 11, said covers having as part thereof suitable axles, and said covers being rigidly attached to struts 7.

It is apparent thus far that the landing gear 5, when the airplane is on the ground, supports the airplane through strut 4, bulkhead 2 and body 1. To prevent the airplane from rocking laterally about the landing gear 5, and to keep the landing gear in a central position with respect to the airplane in flight, and to resist displacement from such central position should the airplane be landed with the lateral axis not parallel to the landing area on the ground, auxiliary spring struts 12 are located between bulkhead 2 and landing gear 5, wholly within body 1, pivoted to each at points 14 and 13, respectively. These struts 12 also shown in Fig. 4, consist essentially of telescoping sliding members enclosing a spring. Normally, their length will be the same. When the landing gear 5 is swung about pivot 6, one spring strut will lengthen, the other will shorten, and the increased compression of the short spring strut 12 will tend to lengthen and return the landing gear to a central position. When the airplane moves along the ground, springs 12 will hold the airplane with its vertical axis substantially normal to the ground. Shock absorber strut 4 in combination with springs 12 will allow the airplane to move vertically with respect to landing gear 5 and hence with respect to the ground, thus dissipating such shocks as may be caused by unevenness in the ground. Both of springs 12 are subject to the vertical movement of landing gear 5, along with movement in the sliding part of strut 4, but springs 12 may act independently of strut 4 in restraining angular motion of landing gear 5 about pivot 6.

Fig. 2, a section through X—X of Fig. 1, shows the general construction and mounting of shock absorbing strut 4 with respect to bulkhead 2 and body 1. 18 designates a rigid point of attachment of upper fixed plunger portion 19 of shock absorber strut 4 to bulkhead 2. 20 designates the shock absorber cylinder which slides over and with respect to plunger 19. The lower portion of cylinder 20 slides within and with respect to a guide 21, said guide being affixed to bulkhead 2. An additional guide 22 serves to guide the upper end of cylinder 20 in a vertical path thus restraining the travel of cylinder 20 to the vertical. Substantially in the center of the cylinder 20 is fixed a boss 23 which constitutes a mounting for pivot 6. As mentioned in the description of Fig. 1, pivot 6 serves as a pivotal mounting for the landing gear.

In action, as landing gear 5 travels up and down vertically, pivot 6 is moved therewith and likewise cylinder 20 is moved therewith. The relation between cylinder 20 and plunger 19, along with suitable hydro-pneumatic, hydro-spring or hydro-rubber means constitutes a shock absorbing device.

Fig. 3 represents a detail of the upper part of the structure of the landing gear 5. The landing gear struts 7 are joined at their apex in the neighborhood of pivot point 6. These struts are strengthened and restricted from movement with respect to each other by means of brace 8 consisting in the present embodiment of gusset plates connecting point 6 with some portion substantially below point 6 on both of the struts 7. At suitable points, eyes 13 are attached to struts 7 and serve as pivots for springs 12 mentioned in Fig. 1 to restrain lateral motion of landing gear 5 about pivot 6.

Fig. 4, a section through Y—Y of Fig. 1, represents a detail of compression springs 12 which serve the purpose of resiliently urging landing gear 5 to a central position relative to the airplane. This spring consists in general of an outer cylinder 23 affixed to pivot 13 and an inner cylinder 24 affixed to pivot 14, pivot 14 coordinating with a fitting on bulkhead 2, and cylinder 24 sliding within and axially with respect to cylinder 23. Within both cylinders 23 and 24 is a compression spring 25. The spring 25 serves to exert a force between pivots 13 and 14, to spread them from each other. Cylinders 23 and 24 serve to guide spring 25 and prevent it from buckling. The two struts 12 above described, and shown in Fig. 1, counteract each other by their respective springs, and at all times tend to urge the landing gear 5 to a central position with respect to the airplane.

By my invention above described, I am able to attain the objects herein set forth and to provide an easily constructed and efficient landing gear for aircraft, simpler than existing types, with increased aerodynamic efficiency resultant from fewer parts exposed to the windstream of the aircraft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft having a body, a landing gear comprising a plurality of struts issuing from said body, means to rigidly connect one to the other within the confines of said body, a pivot within and vertically movable with respect to said body on which said struts are carried for oscillation in a transverse plane, and a ground contact element carried toward the outer end of each said strut.

2. In aircraft, in combination, a fuselage having a substantially vertical shock absorbing strut mounted fixedly therewithin, said strut having a vertically movable portion carrying a boss normally positioned substantially in the center of said fuselage, a pair of outwardly and downwardly extending struts rigidly fixed to each other and trunnioned on said boss for lateral oscillation, means within said fuselage for resiliently maintaining said struts in symmetrical relationship to the plane of symmetry of said aircraft, and a ground contact element carried at the outer end of each said outwardly and downwardly extending strut.

3. In aircraft, a fuselage, a plunger fixed toward the upper part thereof and extending substantially vertically downward therewithin, a cylinder within said fuselage slidable vertically upon said plunger, bearings carried by the fuselage and engaging said cylinder for vertically guiding said cylinder upon said plunger, a trunnion carried on said cylinder, and a strut journaled for lateral oscillation on said trunnion, said strut extending downwardly and outwardly through said fuselage, and a ground contact element at the outer end of said strut.

COLBY W. STEWARD.